Jan. 12, 1943.                 H. F. PLAUT ET AL                    2,307,950
                      LINEAR DIMENSION GAUGE OR COMPARATOR
                           Filed April 7, 1941              2 Sheets-Sheet 2

Patented Jan. 12, 1943

2,307,950

UNITED STATES PATENT OFFICE 2,307,950

LINEAR DIMENSION GAUGE OR COMPARATOR

Hermann Franz Plaut and George Primrose Barrott, Mitcham Junction, England, assignor to Precision Grinding Limited, Mitcham Junction, Surrey, England Application April 7, 1941, Serial No. 387,338
In Great Britain May 28, 1940

2 Claims. (Cl. 33—147)

This invention relates to a known form of optical measuring instrument or so-called comparator used for comparing a dimension of an object with a given standard object. The instrument is of a kind which comprises a support for the object, a feeler which can be moved into contact with the object, a mirror tiltable under the control of the feeler, a graticule, an eye piece, and an intermediate mirror situated between the graticule and the tiltable mirror, the instrument being such that movement of the tiltable mirror causes an image of the graticule to move relatively to a fixed datum mark in the eye piece. When initially setting-up the instrument the movable parts are adjusted so as to bring the image of the graticule into coincidence with the datum mark, and the said parts are then clamped. In the act of clamping it frequently happens that the adjustment is disturbed due to stresses set up in the instrument, and consequently it is sometimes a difficult and tedious matter to effect the initial adjustment accurately. The object of the present invention is to provide an improved instrument wherein this difficulty is obviated in a simple and convenient manner.

The invention comprises an instrument of the kind aforesaid in which the intermediate mirror is movably mounted and has combined with it means whereby this mirror can be adjusted for bringing the graticule image and datum mark into coincidence after initial adjustment has been made.

Figure 1:
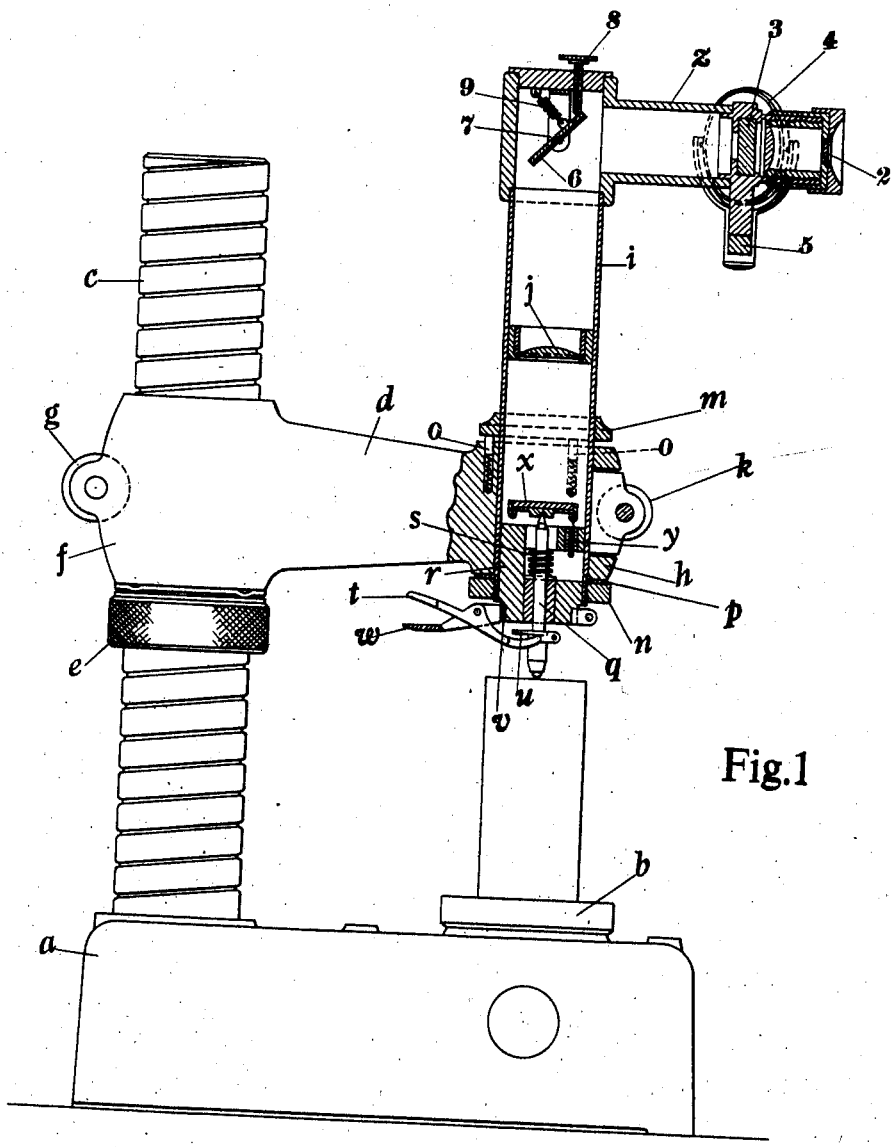
Figure 2:
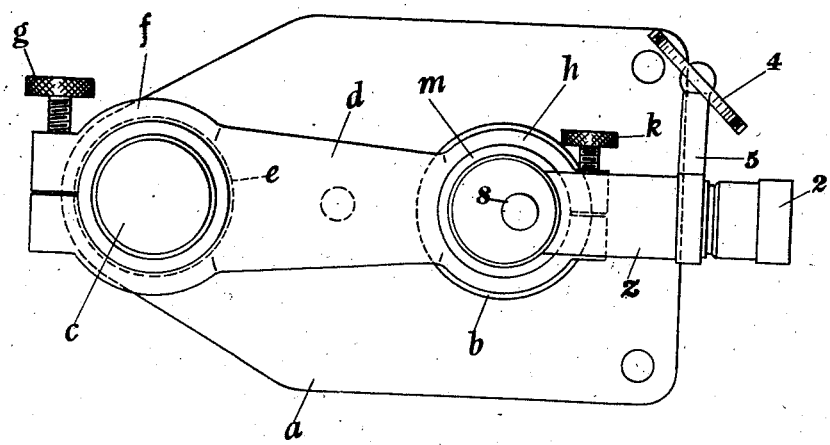

In the accompanying sheets of explanatory drawings, Figures 1 and 2 are respectively a part sectional elevation and a plan of an optical measuring instrument embodying the invention.

In carrying the invention into effect as shown we employ a base $a$ which serves as an object support or has combined with it an adjustable object support $b$. On the base $a$ is secured a vertical pillar $c$, and on this pillar is adjustably mounted a radial arm $d$. For enabling the arm $d$ to be vertically adjusted on the pillar $c$, the latter is screw threaded and provided with a nut $e$ which determines the position of the arm. Also the inner end of the arm $d$ has the form of a hollow and bifurcated or slit boss $f$ which surrounds the pillar at a position above the nut $e$, and which is provided with a clamping screw $g$ for securing it tightly to the pillar.

The outer end of the arm $d$ also has the form of a hollow and slit boss $h$ which serves to support a vertical and axially adjustable tube $i$, and which is provided with a clamping screw $k$ for securing the tube in the desired position. For enabling axial adjustment of the tube $i$ to be effected, it is provided at a position adjacent to the upper end of its supporting boss $h$ with a fixed collar $m$, and at a position beneath this boss with a nut $n$, the collar being spaced from the boss by spring-loaded pins $o$ which extend from the upper end of the boss, and the nut being arranged to abut either directly or through the medium of a washer $p$ on the lower end of the boss. When the clamping screw $k$ is released rotation of the nut $n$ in either direction is accompanied by axial adjusting movement of the tube $i$ in the upward or downward direction.

Supported within and extending from the lower end of the tube $i$ is a vertically slidable feeler $q$ which at its lower end is adapted to bear against a standard object, or an object having a dimension to be compared with the standard object, arranged on the support $b$. The feeler $q$ is carried by the tube $i$ through the medium of a holder $r$ secured in the lower end of the tube $i$, and is loaded by a spring $s$ which serves to retain the feeler in its lowermost position. For enabling the object to be arranged on the support $b$ beneath the feeler $q$, the latter is movable upwardly against the action of its loading spring $s$ by a finger lever $t$ adapted at one end to act on a lateral projection or collar $u$ on the feeler, the lever being pivoted at an intermediate position on a supporting member $v$ secured to the lower end of the holder $r$, and this supporting member being provided at a position adjacent to the other end of the lever with a laterally projecting finger piece $w$. By squeezing the finger piece $w$ and the adjacent end of the lever $t$ between the thumb and finger of one hand, the lever can be actuated for raising the feeler $q$.

The upper end of the feeler $q$ abuts against the underside of a tiltable mirror $x$ contained within and pivoted at one side to the tube $i$, the opposite side of the mirror being connected by a light spring $y$ to the feeler holder $r$. In the normal position of the mirror $x$ its upper face lies substantially at right angles to the axis of the tube $i$.

Arranged within the tube $i$ at a position intermediate its ends is a lens $j$.

At its upper end the tube $i$ is provided with a laterally extending tubular branch $z$ which at its outer end carrier an eye-piece 2 having a fixed datum mark (not shown). Adjacent to the eye-piece 2 there is mounted within the branch $z$ a graticule 3 of any convenient kind which can be illuminated from any suitable light source (not shown). For illuminating the graticule 3 in the example shown a reflector 4 is mounted on an arm or bracket 5 secured to the branch $z$, and is arranged so that it can reflect light from the source on to an exposed portion of the graticule.

Within the junction of the vertical tube $i$ and its lateral branch $z$ is mounted a second mirror 6 having its reflecting surface at about 45° to the axes of the tube and branch, so that an image of the graticule 3 is reflected through the agency of the second mirror on to the tiltable mirror $x$ and then back from the latter mirror to the eye piece 2. According to our invention we pivotally mount this mirror 6 in bearings as 7 so that it can be adjusted about an axis at right angles to the axis of the tube $i$, and in the upper closed end of the tube we arrange an adjusting screw 8 whereby the mirror can be moved in one direction about its pivot axis, movement of the mirror in the opposite direction being effected by a spring 9 which holds the mirror in contact with the screw.

The instrument above described is such that movement of the tiltable mirror $x$ under the control of the feeler $q$ causes an image of the graticule 3 to move relatively to the fixed datum mark in the eye piece 2.

After an initial adjustment of the instrument has been made (with a standard object on the support $b$) for bringing the image of the graticule 3 (as seen through the eye piece 2) into coincidence with the datum mark in the eye piece 2, the arm $d$ and/or the tube $i$ which has or have been moved to effect this adjustment is or are clamped in the desired position or positions. Finally the mirror 6 is adjusted to correct any inaccuracy in the initial adjustment or any disturbance of such adjustment which may have resulted from the clamping operation, and the standard object is removed from the support $b$. With the removal of the standard object from the support $b$, the feeler $q$ and the mirror $x$ return to their lowermost positions.

To compare with the standard object a dimension of another object, the latter is now arranged on the support $b$ in contact with the lower end of the feeler $q$ so that the feeler is held by the object in a raised position dependent on the said dimension, and the position of the image of the graticule 3 relatively to the datum mark in the eye piece 2 effects the desired comparison.

By this invention we are able to ensure accurate adjustment of the instrument in a very simple and expeditious manner.

Having thus described our invention what we claim as new and desire to secure by Letters Patent is:

1. An optical measuring instrument for comparing a dimension of an object with a given standard object, comprising in combination an object support, a movable object feeler, a mirror tiltable under the control of the feeler, a graticule, an eye piece having a fixed datum mark, a second mirror situated between the graticule and the tiltable mirror so that an image of the graticule is reflected through the agency of the second mirror first on to the tiltable mirror and then back from the latter mirror to the eye piece, a second support carrying the movable feeler, the tiltable mirror, the graticule, the eye piece, and the second mirror, and means for adjustably securing the two supports in fixed relationship with each other, the said second mirror being movably carried by its support, and having in association with it means whereby it can be angularly adjusted relatively to the eye piece and tiltable mirror for bringing the graticule image as seen through the eye piece into coincidence with the eye piece datum mark after an initial adjustment of the said means has been effected.

2. An instrument as claimed in claim 1, in which the second mirror is pivotally carried by its support, and has in association with it an adjusting screw for moving it in one direction about its pivotal axis, and a spring for moving it in the opposite direction, the spring serving to hold the mirror in contact with the screw.

HERMANN FRANZ PLAUT.
GEORGE PRIMROSE BARROTT.